UNITED STATES PATENT OFFICE.

WILLIAM M. ZITT, OF CHICAGO, ILLINOIS, ASSIGNOR TO THE McCONNELL ASBESTOS CO., LIMITED, OF PITTSBURG, PENNSYLVANIA.

PROCESS OF MAKING LIGHT MAGNESIA.

SPECIFICATION forming part of Letters Patent No. 663,840, dated December 11, 1900.

Application filed September 14, 1897. Serial No. 651,586. (No specimens.)

*To all whom it may concern:*

Be it known that I, WILLIAM M. ZITT, a resident of Chicago, in the county of Cook and State of Illinois, have invented a new and useful Improvement in Processes of Reducing Magnesia; and I do hereby declare the following to be a full, clear, and exact description thereof.

My invention relates to a process for treating magnesia.

The object of my invention is to provide a simple and inexpensive process for the production of a light voluminous form of magnesia in commercial quantities.

It has been the general practice heretofore in the production of magnesia for use in the arts, medicine, &c., to dissolve and precipitate the magnesia. This process is a slow and tedious one, involving a number of steps, as well as considerable apparatus.

In the practice of my invention I first take magnesite, calcine it, and reduce it to a pulverulent state. I do not wish to be understood, however, as limiting myself to the use of magnesite, as I may employ other mineral-containing magnesia in sufficient quantities.

The proportions of the ingredients depend on the nature of the product desired and the purpose for which it is to be employed. By way of illustration I may take one hundred parts of the pulverulent magnesia and introduce it into a vessel containing from four hundred to five hundred parts of water; but this proportion may be varied within certain limits in both directions. For instance, good results are obtained by taking one hundred (100) parts of magnesia and three hundred (300) parts of water; but better results are obtained by increasing the quantity of water to four hundred (400) parts or even to five hundred (500) or six hundred (600) parts. The essential in all cases is to use such a large proportion of water to pulverized magnesia as to insure a large volume in the hydrated mass, and this cannot be secured if the proportion of water is less than three (3) parts thereof to one (1) part of magnesia. I prefer to employ a closed vessel. To the mixture of pulverized magnesia and water I add fifteen parts of carbonate of ammonia. After the introduction of the ammonia I prefer to agitate the mixture. After the introduction of the ammonia swelling and setting of the magnesia begins to take place, so absorbing the water as to form a gelatinous mass. The agitation seems to assist this swelling and setting action.

The chemical reactions that take place when ammonia or the following salts of ammonia are mixed with magnesia suspended in water are shown from the chemical analyses of the finished product to be as follows:

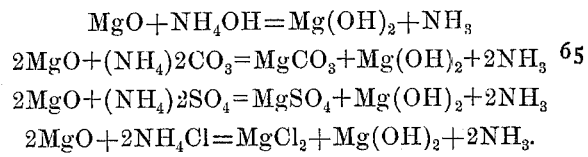

$$MgO + NH_4OH = Mg(OH)_2 + NH_3$$
$$2MgO + (NH_4)2CO_3 = MgCO_3 + Mg(OH)_2 + 2NH_3$$
$$2MgO + (NH_4)2SO_4 = MgSO_4 + Mg(OH)_2 + 2NH_3$$
$$2MgO + 2NH_4Cl = MgCl_2 + Mg(OH)_2 + 2NH_3.$$

As seen from the equations given, the purpose of the ammonia is to rapidly hydrate the magnesia. In the case of a salt of ammonia the acid of that salt—carbonic, sulfuric, hydrochloric, &c.—is at the same time transferred to the magnesia, ammonia being liberated. In practice I use no more ammonia or salt of ammonia as compared to magnesia than the above reactions require, thus insuring the presence of magnesium hydrate.

The hydration of the magnesia takes place so rapidly that a large volume of water is temporarily held, thereby insuring to the dried product an apparent volume equal to all the water originally present. The water, therefore, is the mold that determines by its volume the volume of the hydrated mass, and like any other mold requires a certain amount of material to fill it. If the material is lacking, part of the mold will be empty. The mixture in the gelatinous or pasty state may then be discharged from the vessel in which it has been agitated and placed in molds or other receptacles, according to the use to be made of the finished product. It is of course evident that the mixture may be allowed to remain in the vessel in which it was first mixed, if desired, and the entire process can then be carried on in the same vessel. The mixture in this state is then allowed to dry, so as to retain the shape of the mold or other receptacle containing it. To facilitate this drying operation, the molds are placed in a suitable drying-kiln and subjected to heat. During this drying the ammonia is expelled. The final product, therefore, is magnesium hydrate, together with the salt of magnesia corresponding to the salt of ammonia used where a salt is employed.

While I have referred to the use of carbonate of ammonia, I do not wish to limit myself in any sense to this form of ammonia, but I wish to include within the scope of my invention the use of ammonia broadly, whether in the form of aqua-ammonia, the salts of ammonia, the compounds of ammonia, or ammonia-gas.

The action of the ammonium carbonate in addition to hastening hydration is to transform some of the magnesia into carbonate of magnesia. The chemical reaction which takes place has been given above.

The process may be conducted at any temperature from that of the ordinary atmosphere to a high temperature. Variations in temperature, however, affect the nature of the finished product. Volume and lightness increase with the temperature; strength decreases. Hence, if it is desired to produce a light voluminous product without regard to strength the mixture is highly heated. On the other hand, if strength of product is desired at the expense of lightness and volume the operations are conducted at a lower temperature.

What I claim as my invention, and desire to secure by Letters Patent, is—

1. The process of producing a light, voluminous body containing magnesia, consisting in mixing pulverized magnesia with water in the proportion of one part of magnesia to not less than three parts of water, and adding ammonia thereto, substantially as set forth.

2. The process of producing a light, voluminous body containing magnesia, consisting in mixing pulverized magnesia with water in the proportion of one part of magnesia to not less than three parts of water, and adding ammonia thereto, the magnesia being largely in excess of the ammonia, substantially as set forth.

3. The process of producing a light, voluminous body containing magnesia, consisting in mixing pulverized magnesia with water in the proportion of one part of magnesia to not less than three parts of water, adding ammonia, and agitating the mixture, substantially as set forth.

4. The process of producing a light, voluminous body containing magnesia, consisting in mixing pulverized magnesia with water in the proportion of one part of magnesia to not less than three parts of water, and adding a salt of ammonia, substantially as set forth.

5. The process of producing a light, voluminous body containing magnesia, consisting in mixing pulverized magnesia with water in the proportion of one part of magnesia to not less than three parts of water, adding a salt of ammonia thereto, the magnesia being largely in excess of the salt, substantially as set forth.

6. The process of producing a light, voluminous body containing magnesia, consisting in mixing pulverized magnesia with water in the proportion of one part of magnesia to not less than three parts of water, and adding ammonium carbonate, substantially as set forth.

7. The process of producing a light, voluminous body containing magnesia, consisting in mixing pulverized magnesia with water in the proportion of one part of magnesia to not less than three parts of water, and adding ammonium carbonate in the proportion of not more than one part of ammonium carbonate to four parts of magnesia, substantially as set forth.

In testimony whereof I, the said WILLIAM M. ZITT, have hereunto set my hand.

WILLIAM M. ZITT.

Witnesses:
ROBT. D. TOTTEN,
ROBERT C. TOTTEN.